United States Patent
Gomadam et al.

(10) Patent No.: US 8,923,455 B2
(45) Date of Patent: *Dec. 30, 2014

(54) ASYMMETRICAL FEEDBACK FOR COORDINATED TRANSMISSION SYSTEMS

(71) Applicant: Marvell World Trade Ltd., St. Michael (BB)

(72) Inventors: Krishna Srikanth Gomadam, Sunnyvale, CA (US); Adoram Erell, Herzliya (IL); Daniel Yellin, Ra'anana (IL)

(73) Assignee: Marvell World Trade Ltd., St. Michael (BB)

(\*) Notice: Subject to any disclaimer, the term of this patent is extended or adjusted under 35 U.S.C. 154(b) by 91 days.

This patent is subject to a terminal disclaimer.

(21) Appl. No.: 13/669,481

(22) Filed: Nov. 6, 2012

(65) Prior Publication Data

US 2013/0059596 A1 Mar. 7, 2013

Related U.S. Application Data

(63) Continuation of application No. 12/838,509, filed on Jul. 19, 2010, now Pat. No. 8,325,860.

(60) Provisional application No. 61/259,595, filed on Nov. 9, 2009.

(51) Int. Cl.
| | | |
|---|---|---|
| *H03D 1/04* | (2006.01) | |
| *H03D 1/06* | (2006.01) | |
| *H03K 5/01* | (2006.01) | |
| *H03K 6/04* | (2006.01) | |
| *H04B 1/10* | (2006.01) | |
| *H04L 1/00* | (2006.01) | |
| *H04L 25/08* | (2006.01) | |
| *H04B 17/00* | (2006.01) | |
| *H04W 24/10* | (2009.01) | |

(52) U.S. Cl.
CPC ........... *H04W 24/10* (2013.01); *H04B 17/0067* (2013.01)
USPC ........... 375/346; 375/347; 375/349; 375/285; 375/260; 375/267; 455/452.2; 455/63.1; 455/114.2

(58) Field of Classification Search
USPC ................. 375/346, 347, 349, 285, 260, 267; 455/452.2, 63.1, 114.2, 296
See application file for complete search history.

(56) References Cited

U.S. PATENT DOCUMENTS

| | | | |
|---|---|---|---|
| 5,231,629 A | 7/1993 | Kotzin et al. | |
| 5,263,160 A | 11/1993 | Porter, Jr. et al. | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

U.S. Appl. No. 12/965,878 Official Action dated Apr. 1, 2013.

(Continued)

*Primary Examiner* — Phuong Phu (57) ABSTRACT

A method includes, in a mobile communication terminal, receiving from at least first and second base stations, which cooperate in a coordinated transmission scheme, signals that are transmitted over respective first and second communication channels. Respective channel measures are calculated for the communication channels based on the received signals. First and second feedback data, which are indicative of the respective channel measures of the first and second communication channels, are formulated such that the first feedback data has a first data size and the second feedback data has a second data size, different from the first data size. The first and second feedback data are transmitted from the mobile communication terminal to at least one of the base stations.

23 Claims, 2 Drawing Sheets

(56) References Cited

U.S. PATENT DOCUMENTS

| | | |
|---|---|---|
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 8,325,860 B2 * | 12/2012 | Gomadam et al. ............ 375/346 |
| 8,515,435 B2 | 8/2013 | Krasny et al. |
| 8,559,879 B2 | 10/2013 | Bhushan et al. |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreaux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 * | 2/2010 | Hou et al. .................. 455/452.2 |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0113078 A1 | 5/2010 | Farajidana et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273495 A1 | 10/2010 | Onggosanusi et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshno et al. |
| 2010/0296603 A1 | 11/2010 | Lee et al. |
| 2011/0013710 A1 | 1/2011 | Xiao |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0044193 A1 | 2/2011 | Forenza et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0134774 A1 | 6/2011 | Pelletier et al. |
| 2011/0150052 A1 | 6/2011 | Erell et al. |
| 2011/0158190 A1 | 6/2011 | Kuwahara et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0176439 A1 | 7/2011 | Mondal et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |

(56) References Cited

U.S. PATENT DOCUMENTS

| | | | |
|---|---|---|---|
| 2012/0002568 | A1 | 1/2012 | Tiirola et al. |
| 2012/0002743 | A1 | 1/2012 | Cavalcante et al. |
| 2012/0003926 | A1 | 1/2012 | Coldrey et al. |
| 2012/0020433 | A1 | 1/2012 | Bhattad et al. |
| 2012/0028628 | A1 | 2/2012 | Frenger et al. |
| 2012/0033592 | A1 | 2/2012 | Kim et al. |
| 2012/0033630 | A1 | 2/2012 | Chung et al. |
| 2012/0034927 | A1 | 2/2012 | Papasakellariou et al. |
| 2012/0039369 | A1 | 2/2012 | Choi et al. |
| 2012/0058735 | A1 | 3/2012 | Vermani et al. |
| 2012/0063336 | A1 | 3/2012 | Shany et al. |
| 2012/0069887 | A1 | 3/2012 | Park et al. |
| 2012/0069917 | A1 | 3/2012 | Liu et al. |
| 2012/0076028 | A1 | 3/2012 | Ko et al. |
| 2012/0076038 | A1 | 3/2012 | Shan et al. |
| 2012/0087425 | A1 | 4/2012 | Gomadam et al. |
| 2012/0087435 | A1 | 4/2012 | Gomadam et al. |
| 2012/0134434 | A1 | 5/2012 | Chen et al. |
| 2012/0188976 | A1 | 7/2012 | Kim et al. |
| 2012/0213261 | A1 | 8/2012 | Sayana et al. |
| 2012/0219042 | A1 | 8/2012 | Onggosanusi et al. |
| 2012/0219083 | A1 | 8/2012 | Tong et al. |
| 2012/0250550 | A1 | 10/2012 | Gomadam et al. |
| 2012/0257664 | A1 | 10/2012 | Yue et al. |
| 2012/0275376 | A1 | 11/2012 | Sampath et al. |
| 2012/0275386 | A1 | 11/2012 | Frenne et al. |
| 2012/0281620 | A1 | 11/2012 | Sampath et al. |
| 2012/0329502 | A1 | 12/2012 | Frederiksen et al. |
| 2013/0028068 | A1 | 1/2013 | Park et al. |
| 2013/0028344 | A1 | 1/2013 | Chen et al. |
| 2013/0039284 | A1 | 2/2013 | Marinier et al. |
| 2013/0051256 | A1 | 2/2013 | Ong et al. |
| 2013/0077595 | A1 | 3/2013 | Aiba et al. |
| 2013/0083681 | A1 | 4/2013 | Mahalleh et al. |
| 2013/0107916 | A1 | 5/2013 | Liu et al. |
| 2013/0114427 | A1 | 5/2013 | Maattanen et al. |
| 2013/0114431 | A1 | 5/2013 | Koivisto |
| 2013/0128847 | A1 | 5/2013 | Wang et al. |
| 2013/0176991 | A1 | 7/2013 | Yi |
| 2013/0182786 | A1 | 7/2013 | Frenne et al. |
| 2013/0250885 | A1 | 9/2013 | Davydov et al. |
| 2013/0272221 | A1 | 10/2013 | Hoehne et al. |
| 2014/0029586 | A1 | 1/2014 | Loehr et al. |
| 2014/0051357 | A1 | 2/2014 | Steer et al. |

FOREIGN PATENT DOCUMENTS

| | | | |
|---|---|---|---|
| JP | 2008054125 | A | 3/2008 |
| JP | 2008118411 | A | 5/2008 |
| JP | 2008147792 | A | 6/2008 |
| WO | 2005117283 | A2 | 12/2005 |
| WO | 2007133564 | A3 | 11/2007 |
| WO | 2008009157 | A1 | 1/2008 |
| WO | 2008133582 | A2 | 11/2008 |
| WO | 2009116471 | A1 | 9/2009 |
| WO | 2010013950 | A2 | 2/2010 |
| WO | 2011147692 | A1 | 12/2011 |

OTHER PUBLICATIONS

U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT DoCoMo et al., "Prioritized Deployment Scenarios for LTE-Advanced Studies", 3GPP TSG RAN WG4 Meeting #50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.

(56) References Cited

OTHER PUBLICATIONS

3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAM WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
U.S. Appl. No. 61/585,556, filed Jan. 11, 2012.
U.S. Appl. No. 13/669,476, filed Nov. 6, 2012.
U.S. Appl. No. 13/669,477, filed Nov. 6, 2012.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 13/672,727, filed Nov. 9, 2012.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAM Working Group 1 Meeting #55, Prague, Czech Republic, Nov. 10-14, 2008.
NTT DoCoMo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.

(56) References Cited

OTHER PUBLICATIONS

Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/249,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAB WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DoCoMo), "Text Proposal for RAN1 TR on LTE Advanced", 3GPP TSG RAN WG1 Meeting #53bis, Warsaw, Poland, Jun. 30-Jul. 4, 2008.

Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
U.S. Appl. No. 12/965,878 Office Action dated Oct. 24, 2013.
U.S. Appl. No. 13/052,075 Notice of Allowance dated Nov. 8, 2013.
U.S. Appl. No. 13/543,835 Office Action dated Nov. 22, 2013.
U.S. Appl. No. 12/965,878 Notice of Allowance dated Feb. 10, 2014.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
JP Patent Application # 2011-551560 Office Action dated Oct. 29, 2013.
JP Patent Application # 2012-506601 Office Action dated Oct. 22, 2013.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT DoCoMo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAM WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 13/610,904 Office Action dated May 1, 2014.
U.S. Appl. No. 13/433,293 Office Action dated Jun. 24, 2014.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT DoCoMo, 3GPP TSG RAN WG1, "Views on Scalable CSI Feedback for DL CoMP in LTE-Advanced" , Meeting #58bis, R1-094243, pp. 1-5, Oct. 12-16, 2009.
NTT DoCoMo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.
U.S. Appl. No. 13/672,727 Office Action dated Sep. 19, 2014.
European Application # 12765629 Search Report dated Aug. 5, 2014.
U.S. Appl. No. 13/610,904 Office Action dated Oct. 7, 2014.

* cited by examiner

ASYMMETRICAL FEEDBACK FOR COORDINATED TRANSMISSION SYSTEMS

CROSS-REFERENCE TO RELATED APPLICATIONS

This application is a continuation of U.S. patent application Ser. No. 12/838,509, filed Jul. 19, 2010, which claims the benefit of U.S. Provisional Patent Application 61/259,595, filed Nov. 9, 2009. The disclosures of these related applications are incorporated herein by reference.

FIELD OF THE DISCLOSURE

The present invention relates generally to communication systems, and particularly to methods and systems for providing feedback regarding communication channels.

BACKGROUND

Some Multiple-Input Multiple-Output (MIMO) communication systems use cooperative transmission schemes, in which multiple base stations coordinate beamforming and precoding decisions with one another. Coordinated transmission is also referred to as coordinated beamforming or Coordinated Multipoint (COMP). Coordinated transmission is considered, for example, for Evolved Universal Terrestrial Radio Access (E-UTRA) systems, also referred to as Long-Term Evolution (LTE), which are specified by the Third Generation Partnership Project (3GPP). Cooperative beamforming for LTE is described, for example, in document R1-093488 of the 3GPP Technical Specification Group (TSG) Radio Access Network (RAN), entitled "LTE Spectral Efficiency and IMT-Advanced Requirements," Shenzhen, China, Aug. 24-28, 2009, which is incorporated herein by reference.

Coordinated transmission schemes often use feedback regarding the communication channels, which is fed back from the mobile terminals to the base stations. An example feedback scheme for coordinated transmission is described in 3GPP TSG RAN document R1-092634, entitled "CoMP Operation Based on Spatial Covariance Feedback and Performance Results of Coordinated SU/MU Beamforming," Los Angeles, Calif., Jun. 29-Jul. 3, 2009, which is incorporated herein by reference.

3GPP TSG RAN document R1-093474, entitled "Coordinated Beamforming with DL MU-MIMO," Shenzhen, China, Aug. 24-28, 2009, which is incorporated herein by reference, describes a Multi-User MIMO (MU-MIMO) scheme with coordinated beamforming, which is based on a long-term wideband transmit covariance matrix.

CoMP schemes are also considered for LTE-Advanced (LTE-A) systems. Example CoMP schemes for LTE-A, with reference to feedback, are described in 3GPP TSG RAN document R1-093833, entitled "System Performance Comparisons of Several DL CoMP schemes," Miyazaki, Japan, Oct. 12-16, 2009, which is incorporated herein by reference. 3GPP TSG RAN document R1-093132, entitled "DL performance of LTE-A: FDD," Shenzhen, China, Aug. 24-28, 2009, which is incorporated herein by reference, describes LTE-A MU-MIMO schemes with CoMP using Frequency Division Duplexing (FDD). 3GPP TSG RAN document R1-093109, entitled "Feedback in Support of DL CoMP: General Views," Shenzhen, China, Aug. 24-28, 2009, which is incorporated herein by reference, discusses several feedback design options for implementing CoMP in LTE-A systems.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

An embodiment that is described herein provides a method used in a mobile communication terminal. The method includes receiving from at least first and second base stations, which cooperate in a coordinated transmission scheme, signals that are transmitted over respective first and second communication channels. Respective channel measures are calculated for the communication channels based on the received signals. First and second feedback data, which are indicative of the respective channel measures of the first and second communication channels, are formulated such that the first feedback data has a first data size and the second feedback data has a second data size, different from the first data size. The first and second feedback data are transmitted from the mobile communication terminal to at least one of the base stations.

In an embodiment, formulating the first and second feedback data includes including in the first feedback data at least one feedback parameter that is not included in the second feedback data. In another embodiment, formulating the first and second feedback data includes representing the first feedback data at a first quantization, and representing the second feedback data at a second quantization, different from the first quantization. In yet another embodiment, formulating the first and second feedback data includes calculating the first feedback data at a first spectral resolution, and calculating the second feedback data at a second spectral resolution, different from the first spectral resolution.

In a disclosed embodiment, transmitting the first and second feedback data includes transmitting the first feedback data at a first update rate, and transmitting the second feedback data at a second update rate, different from the first update rate. In another embodiment, when the first base station is designated as a serving base station via which the mobile communication terminal conducts calls, formulating the first and second feedback data includes causing the second data size to be smaller than the first data size. In yet another embodiment, formulating the first and second feedback data includes, upon identifying that first interference caused by the first base station is stronger than second interference caused by the second base station, computing the first feedback data at a first data size and computing the second feedback data at a second data size, smaller than the first data size.

In some embodiments, formulating the first and second feedback data includes computing for the first and second communication channels respective first and second channel matrices having respective different first and second ranks. In an embodiment, formulating the first and second feedback data includes defining the first feedback data as the respective channel measure of the first communication channel, and defining the second feedback data as an implicit function of the respective channel measure of the second communication channel. In another embodiment, the method includes receiving in an additional mobile communication terminal a signal from the first base station over a third communication channel, formulating third feedback data for the third communication channel such that the third feedback data has a third data size that is different from the first data size, and transmitting the third feedback data from the additional mobile communication terminal to at least the one of the base stations.

There is additionally provided, in accordance with an embodiment that is described herein, apparatus including a receiver, a transmitter and processing circuitry. The receiver is configured to receive from at least first and second base stations, which cooperate in a coordinated transmission scheme, signals that are transmitted over respective first and second communication channels. The processing circuitry is configured to calculate respective channel measures for the communication channels based on the received signals, and to formulate first and second feedback data that are indicative of the respective channel measures of the first and second communication channels, such that the first feedback data has a first data size and the second feedback data has a second data size, different from the first data size. The transmitter is configured to transmit the first and second feedback data to at least one of the base stations. In an embodiment, a mobile communication terminal includes the apparatus described herein. In another embodiment, a chipset for processing signals in a mobile communication terminal includes the apparatus described herein.

There is also provided, in accordance with an embodiment that is described herein, a system that includes at least first and second base stations and a mobile communication terminal. The base stations cooperate in a coordinated transmission scheme and are configured to transmit signals to mobile communication terminals. The mobile communication terminal is configured to receive the signals from the first and second base stations over respective first and second communication channels, to calculate respective channel measures for the communication channels based on the received signals, to formulate first and second feedback data that are indicative of the respective channel measures of the first and second communication channels, and to transmit the first feedback data at a first data size and the second feedback data at a second data size, different from the first data size, to at least one of the base stations.

The present invention will be more fully understood from the following detailed description of the embodiments thereof, taken together with the drawings in which:

DETAILED DESCRIPTION OF EMBODIMENTS

In some cooperative transmission schemes, base stations collect feedback from mobile communication terminals regarding communication channel characteristics, and configure downlink transmissions based on the feedback. In many practical scenarios, the volume of feedback that is transmitted from various terminals in the network consumes considerable uplink bandwidth, and may therefore degrade system capacity and performance.

Embodiments that are described hereinbelow provide improved methods and systems for delivering feedback from mobile communication terminals to base stations that use cooperative transmission. In these methods and systems, a given terminal receives downlink signals from multiple base stations over multiple communication channels, and generates feedback data for the multiple channels. The terminal transmits the feedback data to at least one of the base stations, typically to a base station that is defined as the serving base station of the terminal. The base stations configure their downlink transmissions based on the feedback data.

In the disclosed embodiments, the terminal formulates the feedback data for one communication channel with a certain data size, and with a different data size for another communication channel. In other words, the terminal formulates the feedback data for at least two of the channels to differ in data size. Several example techniques for generating feedback data with non-uniform, or asymmetrical, data size are described herein. The feedback data for different channels may differ, for example, in the number or identity of feedback parameters, quantization level, spectral resolution and/or update rate.

In some embodiments, the terminal selects which channels will receive larger-size feedback data and which channels will receive smaller-size feedback data, according to a certain selection criterion. Several examples of selection criteria are described herein. Typically, channels whose impact on the terminal (e.g., interference) is large will receive larger-size feedback data, and vice versa. In some embodiments, non-uniform data size is applied across different terminals. In other words, two terminals may transmit feedback data having different data sizes.

The disclosed techniques enable the terminal to match the data size (and thus the accuracy) of the feedback data per communication channel, rather than having to compromise for a fixed data size for all channels. As a result, highly-accurate feedback can be obtained where needed, while transmitting smaller-size feedback data for the other channels. Thus, the average uplink bandwidth used for feedback transmission is reduced considerably, with little or no degradation in feedback performance.

Figure 1:
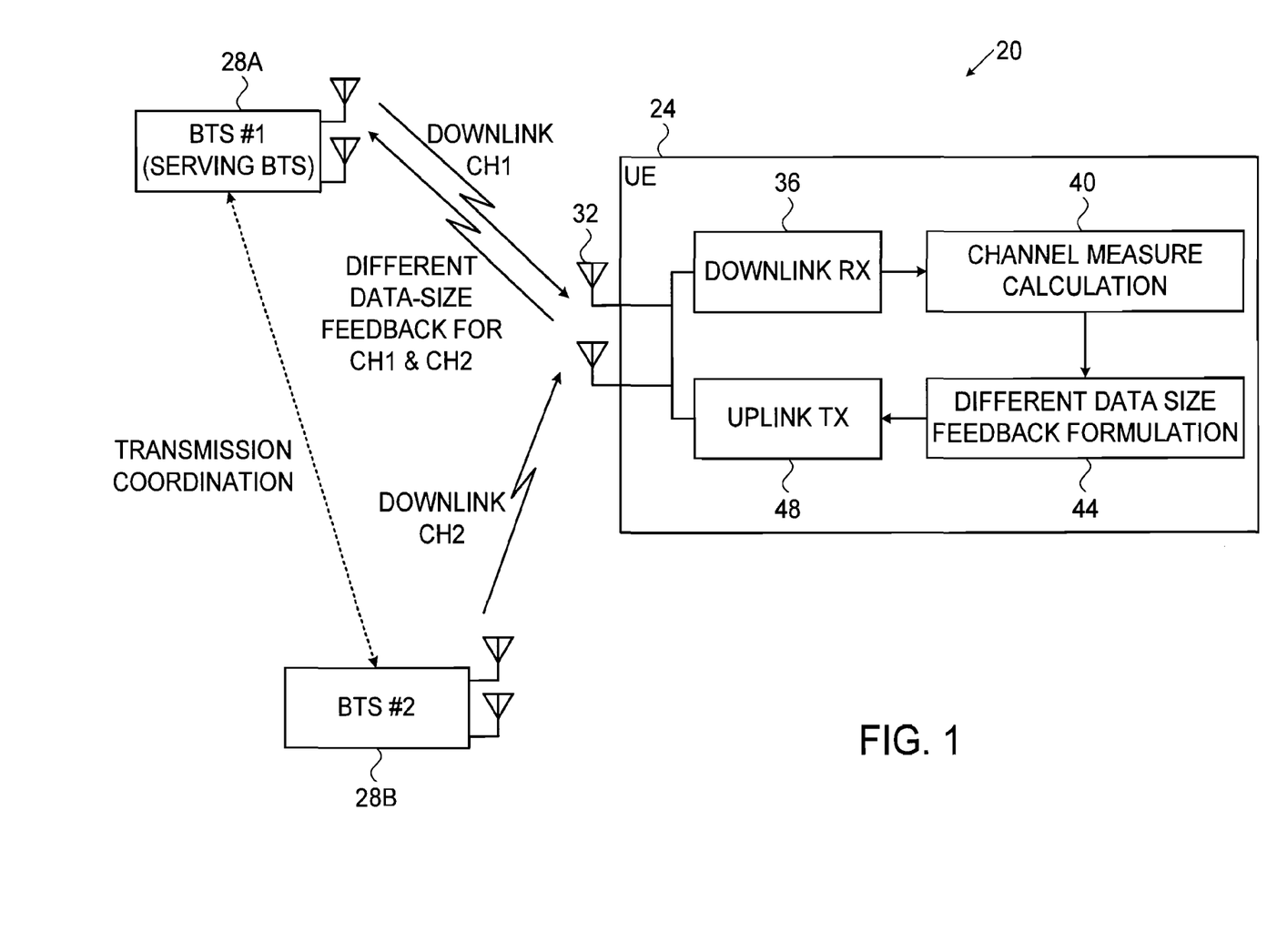
FIG. 1 is a block diagram that schematically illustrates a communication system using coordinated transmission and asymmetrical feedback, in accordance with an embodiment that is described herein.

FIG. 1 is a block diagram that schematically illustrates a communication system 20, which uses coordinated transmission and asymmetrical feedback, in accordance with an embodiment that is described herein. System 20 comprises a mobile communication terminal 24 (also referred to as User Equipment—UE), and two Base Transceiver Stations (BTSs) 28A and 28B. UE 24 may comprise, for example, a cellular phone, a communication-enabled mobile computing device, a cellular adapter for a mobile computing device, or any other suitable communication terminal. Although FIG. 1 shows a single UE and two BTSs for the sake of clarity, real-life systems typically comprise multiple UEs and multiple BTSs.

In the present example, system 20 operates in accordance with the 3GPP Long-Term Evolution Advanced (LTE-A) specifications. Alternatively, however, system 20 may operate in accordance with any other suitable communication standard or protocol. For example, the disclosed techniques can also be applied in Wi-Fi systems operating in accordance with the IEEE 802.11 specifications or in WiMAX systems operating in accordance with the IEEE 802.16m specifications.

The BTSs in system 20 use a coordinated transmission scheme, in which they coordinate their downlink transmissions, and in particular coordinate their scheduling and beam-forming decisions. At a given point in time, UE 24 receives downlink signals from multiple BTSs. A subset of these BTSs (which may comprise all the BTSs that are received by the UE or a partial subset of the received BTSs) is defined as the reporting set of the UE, i.e., as the set of BTSs for which the UE provides channel feedback.

In UE 24, the downlink signals are received by one or more UE antennas 32. Typically, system 20 comprises a MIMO system, meaning that the BTSs and the UE each comprises multiple antennas. Each downlink signal is received over a respective communication channel between a certain BTS and the UE. UE 24 comprises a downlink receiver 36, which receives the downlink signals from the BTSs. Receiver 36 typically down-converts, filters and digitizes the downlink signals. The UE further comprises a channel measure calculation unit 40, which calculates a respective channel measure for each communication channel by processing the received downlink signals. Unit 40 may calculate various types of channel measures that are indicative of the characteristics of the respective channels.

Some channel measures are explicit, i.e., refer to channel characteristics irrespective of any specific transmission or reception scheme. Other channel measures are implicit, i.e., based on certain assumptions regarding the transmission or reception scheme. Examples of explicit channel measures comprise channel matrices (e.g., matrices representing the transfer amplitude and phase for different pairs of BTS antenna and UE antenna) and channel covariance matrices (e.g., matrices representing auto- and cross-correlations between the signals received via different pairs of BTS antenna and UE antenna). Examples of implicit channel measures comprise Preferred Matrix Indices (PMI) and Channel Quality Indications (CQI), as defined in the E-UTRA specifications. Unit 40 may calculate any of these types of channel measures, or any other suitable type of channel measure. For a MIMO system, each channel measure typically comprises multiple parameters.

UE 24 comprises a feedback formulation unit 44, which formulates the channel measures produced by unit 40 into respective feedback data. In particular, unit 44 produces feedback data having non-uniform data size. In other words, the feedback data for one channel may differ in data size from the feedback data for another channel. Example techniques for formulating the feedback data at a non-uniform data size are described below.

Note that the term "feedback data that differ in data size" refers only to non-zero data size, i.e., to those channels (or BTSs) for which the UE provides non-empty feedback. By contrast, a BTS for which the UE does not provide feedback (e.g., a BTS that is not in the reporting set of the UE) is not considered herein as differing in feedback data size from a BTS for which the UE does provide feedback.

In the description above, UE 24 generates the feedback data in two stages—channel measure calculation followed by feedback data formulation. In such embodiments, the channel measures are not necessarily of non-uniform data size. Assignment of different data sizes to different feedback data (i.e., for different channels) is carried out by unit 44. In alternative embodiments, the functions of units 40 and 44 are combined in a single unit. In such embodiments, the channel measures are calculated a-priori at a data size that potentially differs from one channel to another.

Unit 44 provides the feedback data for the different channels to an uplink transmitter 48. The uplink transmitter converts the feedback data to an analog signal, up-converts the signal to a suitable Radio Frequency (RF) and transmits the RF signal (and thus the feedback data) to at least one of the BTSs. Typically, one of the BTSs is defined as the serving BTS of the UE, and transmitter 48 transmits the feedback data to the serving BTS. The serving BTS distributes the feedback to the other BTSs, and the BTSs use this information for configuring their downlink transmissions.

In the example configuration of FIG. 1, UE 24 receives downlink signals from two BTSs 28A and 28B over two communication channels denoted CH1 and CH2, respectively. The UE calculates channel measures and formulates feedback data for these two channels. In the present example, the feedback data for CH1 has a different data size relative to the feedback data for CH2. BTS 28A is defined as the serving BTS of UE 24, and therefore the UE transmits the feedback data for both channels to this BTS. BTS 28A distributes the feedback data to BTS 28B, so that the two BTSs can configure and coordinate their downlink transmissions based on the feedback data.

The system configuration shown in FIG. 1 is a simplified example configuration, which is depicted solely for the sake of conceptual clarity. In alternative embodiments, any other suitable system configuration can be used. For example, UE 24 may receive downlink signals from any suitable number of BTSs, and produce feedback data for any desired number of channels. In some networks, two or more sets of equipment (e.g., transceivers and antennas), which serve different geographical cells, are collocated with one another. In the context of the present patent application, the equipment serving each cell is regarded as a separate BTS. Multiple BTSs serving multiple cells may be collocated in the same location.

The UE configuration shown in FIG. 1 is a simplified example configuration, which is depicted solely for the sake of conceptual clarity. In alternative embodiments, any other suitable UE configuration can be used. UE elements that are not necessary for understanding the disclosed techniques have been omitted from the figure for the sake of clarity.

The different elements of UE 24, including receiver 36, units 40 and 44 and transmitter 48, may be implemented using dedicated hardware, such as using one or more Application-Specific Integrated Circuits (ASICs), Field-Programmable Gate Arrays (FPGAs) or other suitable hardware devices. Alternatively, some UE elements may be implemented using software configured to run on a processor device, or using a combination of hardware and software elements. When certain UE functions are implemented using a processor, the processor is programmed in software to carry out the functions described herein, although it too may be implemented on dedicated hardware. The software may be downloaded to the processor in electronic form, over a network, for example, or it may, alternatively or additionally, be provided and/or stored on non-transitory tangible media, such as magnetic, optical or electronic memory. In some embodiments, some or all of the elements of UE 24 may be fabricated in a chip-set.

Feedback formulation unit 44 may formulate the feedback data for different channels at different data sizes in various ways. Moreover, unit 44 may use various criteria to select the appropriate data size for each channel. Generally, the accuracy of the feedback data increases with data size. Thus, modifying the feedback data size can trade feedback accuracy for uplink throughput, and vice versa.

In some embodiments, unit 44 formulates the feedback data for the channel received from the serving BTS at a larger data size, in comparison with the channels received from other BTSs. In the example configuration of FIG. 1, unit 44 formulates the feedback data for CH1 to have a larger data size than the feedback data for CH2. Since the impact of the serving BTS on the UE performance is stronger than the impact of other BTSs, providing higher-accuracy feedback for the serving BTS and lower-accuracy feedback for the other BTSs increases the feedback efficiency.

In some embodiments, feedback formulation unit 44 selects the appropriate feedback data size based on the level of interference caused by the different BTSs. For example, unit 44 may produce large-size (high-accuracy) feedback data for BTSs that cause strong interference to the UE, and vice versa. Additionally or alternatively, in an embodiment, unit 44 selects the feedback data size for the different downlink channels in accordance with any other suitable criterion.

In an embodiment, unit 44 generates feedback data at a non-uniform data size using various techniques. The description that follows refers to the feedback data for channels CH1 and CH1 of FIG. 1, and presents example techniques for formulating the feedback data to differ in data size. The feedback data for CH1 is referred to as FB1, and the feedback data for CH2 is referred to as FB2, respectively. In the present example, both FB1 and FB2 are transmitted to BTS 28A, the serving BTS of UE 24. Since BTS 28A is the serving BTS, FB1 is formulated to have a larger data size than FB2. Generally, however, the techniques described below can be used in any other suitable system configuration.

In an example embodiment, FB1 and FB2 each comprise one or more feedback parameters. UE 24 formulates FB1 to differ from FB2 in the number and/or identity of the parameters. Consider, for example, an embodiment in which each feedback data comprises a covariance matrix for the respective channel. In an example embodiment, FB1 comprises a certain number of eigenvectors (of the covariance matrix for CH1) and FB2 comprises a smaller number of eigenvectors (of the covariance matrix for CH2). The number of reported eigenvectors is sometimes referred to as the rank of the feedback data. In an example embodiment, the number of eigenvectors in FB1 is up to the maximum rank of transmission for the UE, and the number of eigenvectors in FB2 is 1 or alternatively 2. In a typical embodiment for a 2-antenna UE, FB1 comprises two eigenvectors and FB2 comprises a single eigenvector.

Transmitting different numbers of feedback parameters is useful, for example, in a Coordinated Beamforming (CB) mode of operation, in which interfering BTSs refrain from transmitting to a given UE at a given time in order to reduce interference. Nevertheless, this technique can also be used in other coordinated-transmission operational modes, as well. In alternative embodiments, UE 24 may configure FB1 and FB2 to differ in the number and/or identity of any other suitable feedback parameters.

In another embodiment, UE 24 formulates FB1 to have a finer quantization level than FB2. In some embodiments, UE 24 selects the feedback data (e.g., channel matrix or covariance matrix) from a predefined set of possible values, referred to as a codebook. In these embodiments, UE 24 selects FB1 from a larger codebook than the codebook from which FB2 is selected.

Consider, for example, a coherent Joint Processing (JP) mode of operation, in which two or more BTSs jointly generate a given transmission beam toward the UE. When using this mode, the signal received at the UE is often predominated by the one or two strongest BTSs. In a scenario of this sort, transmitting feedback data using different-size codebooks for different BTSs is effective, since it provides considerable bandwidth reduction with little or no degradation in feedback efficiency. In an example embodiment, the UE selects the feedback data for the strongest BTS from a codebook whose size is denoted B, the feedback data for the next-strongest BTS from a codebook whose size is denoted B/2, and so on. In an example embodiment, $B=2^m$, wherein possible values of m are 4, 5 and 6. Alternatively, any other suitable codebook sizes can be used. Although the example above refers to JP mode of operation, this technique can also be used in other coordinated-transmission operational modes, as well.

An example of using different feedback parameters for different channels is the use of feedback based on implicit and explicit channel measures. Explicit channel measures, as defined above, refer to channel characteristics irrespective of any specific transmission or reception scheme. Implicit channel measures, on the other hand, are based on certain assumptions regarding the transmission or reception scheme. Explicit channel measures comprise, for example, channel matrices or covariance matrices. Implicit channel measures comprise, for example, PMI or CQI. In some embodiments, UE 24 formulates FB1 (for the serving BTS) based on one or more explicit channel measures, and FB2 based on one or more implicit channel measures. In alternative embodiments, UE 24 formulates FB1 based on one or more implicit channel measures, and FB2 based on one or more explicit channel measures.

In some embodiments, UE 24 formulates FB1 to have a finer quantization level than FB2 by representing FB1 at a finer numerical precision than FB2. For example, the feedback parameters in FB1 can be represented using a larger number of bits than FB2. In alternative embodiments, the UE may use any other suitable scheme for formulating the feedback data for different channels to differ in quantization level.

In some embodiments, UE 24 formulates FB1 to have a finer spectral resolution than FB2. In these embodiments, UE 24 estimates the feedback data for each channel (e.g., channel matrix or covariance matrix) in a certain number of frequency sub-bands. The UE transmits FB1 for a larger number of sub-bands than FB2. In other words, each feedback parameter in FB1 corresponds to a narrower sub-band than the respective parameter in FB2. Therefore, FB1 is typically more accurate than FB2, at the expense of larger data size. In the present example, the feedback data for the serving BTS is transmitted at a finer spectral resolution than the feedback data for other BTSs. Consider, for example, a total bandwidth of 10 MHz that comprises fifty resource blocks. In an example embodiment, FB1 comprises ten values for ten respective sub-bands, each sub-band comprising five resource blocks, and FB2 comprises a single value for the entire bandwidth (fifty resource blocks). Alternatively, however, UE 24 can formulate the feedback data to differ in spectral resolution using any other suitable criterion.

In some embodiments, UE 24 updates FB1 at a faster update rate than FB2. Each update may be of the same data size or of non-uniform data size. Nevertheless, because FB1 is updated more frequently, the data size of FB1 over a certain time period is larger than the data size of FB2. In an example embodiment, FB1 is updated every 5-50 mS, and FB2 is updated every 50 mS-1 S. Alternatively, any other suitable update rates can be used.

UE 24 may use a higher update rate for the feedback data regarding stronger BTSs, and lower update rates for the feedback data regarding weaker BTSs, or vice versa.

In some embodiments, UE 24 sets a different update rate for different feedback parameters in the feedback data of a given channel. For example, when the feedback data comprises a channel matrix, the UE may update the magnitudes of the matrix elements (which sometimes vary rapidly) at a relatively fast update rate, and the phases of the matrix elements (which often vary slowly) at a slower rate. This differential selection of update rate may also vary from one channel to another.

In some embodiments, FB1 may differ from FB2 in a combination of two or more of the above properties (e.g., number or identity of parameters, quantization level, spectral resolution and/or in update rate), or in any other suitable property.

Figure 2:
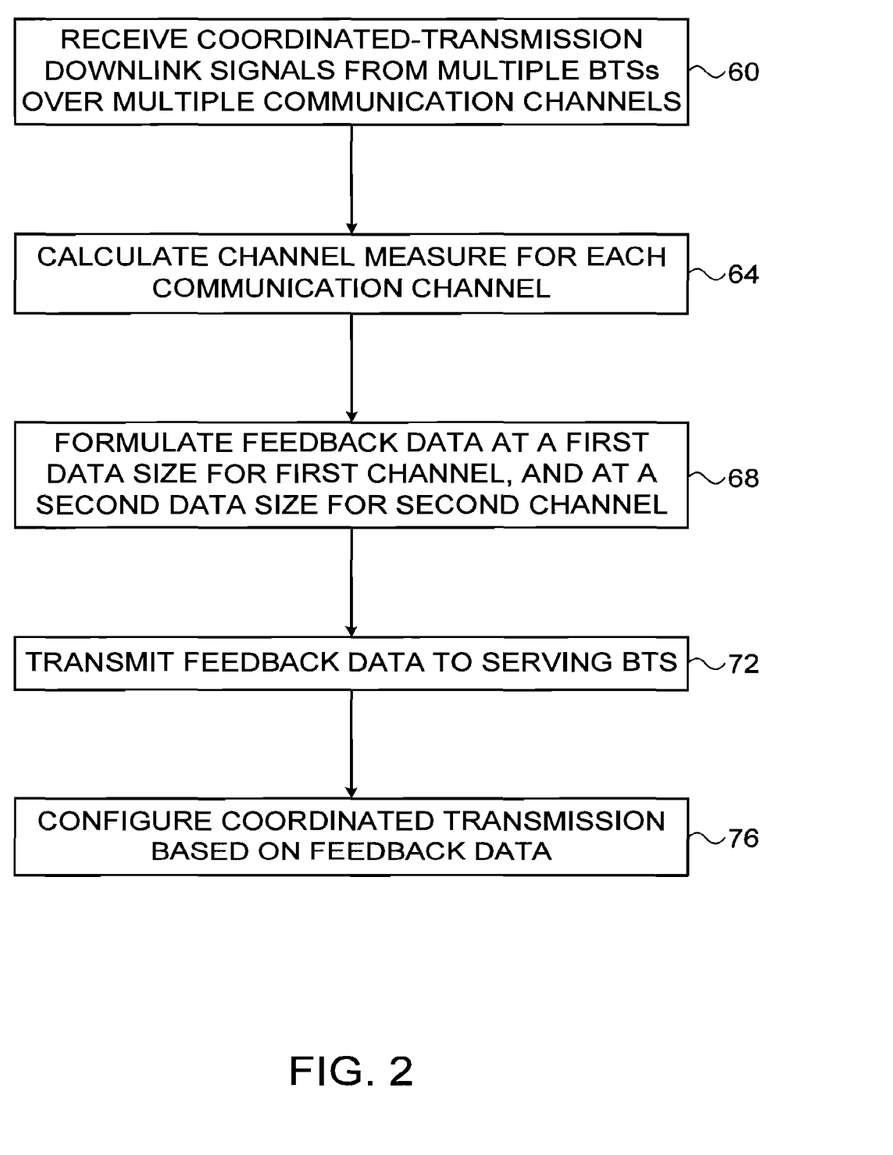
FIG. 2 is a flow chart that schematically illustrates a method for communication using coordinated transmission and asymmetrical feedback, in accordance with an embodiment that is described herein.

FIG. 2 is a flow chart that schematically illustrates a method for communication using coordinated transmission and asymmetrical feedback, in accordance with an embodiment that is described herein. The method begins at a reception operation 60, with UE 24 receiving coordinated-transmission downlink signals from two or more BTSs over respective communication channels. At a channel measurement operation 64, unit 40 in UE 24 calculates channel measures (e.g., channel or covariance matrices) for the respective communication channels.

At a feedback formulation operation 68, unit 44 in UE 24 formulates the feedback data for each channel based on the respective channel measure. In particular, unit 44 formulates the feedback data for at least two of the channels to differ in data size, as explained above. At a feedback transmission operation 72, transmitter 48 in UE 24 transmits the feedback data for the multiple channels to at least one of the BTSs, typically to the serving BTS. At a transmission coordination operation 76, the BTSs coordinate their downlink transmissions to UE 24 (and/or to other UEs) based on the feedback data.

In the embodiments described above, the UE formulates different-size feedback data for different communication channels (i.e., for different BTSs). Additionally or alternatively, non-uniformity in feedback data size can be applied across different UEs. In other words, two (or more) different UEs can formulate the feedback data for a given BTS to differ in data size. Any of the techniques described above (e.g., feedback data that differs in the number or identity of parameters, in quantization level, in spectral resolution and/or in update rate) can be used.

Although the embodiments described herein mainly address generation of channel feedback data from mobile communication terminals to base stations at a non-uniform data size, the methods and systems described herein can also be used in other applications in which multiple transmitters coordinate their transmission with one another, such as in Wi-Fi and WiMAX systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a mobile communication terminal, receiving from at least first and second base stations, which cooperate in a coordinated transmission scheme such that the first base station is designated as a serving base station via which the mobile communication terminal conducts calls, signals that are transmitted over respective first and second communication channels, and calculating for the communication channels, based on the received signals, respective channel measures that are independent of a transmission or reception scheme used by the base stations and the terminal;
formulating first and second feedback data, which are indicative of the respective channel measures of the first and second communication channels and have respective first and second data sizes, such that the first data size formulated for the serving base station is larger than the second data size; and
transmitting the first and second feedback data from the mobile communication terminal to at least one of the base stations.

2. The method according to claim 1, wherein formulating the first and second feedback data comprises including in the first feedback data at least one feedback parameter that is not included in the second feedback data.

3. The method according to claim 1, wherein formulating the first and second feedback data comprises representing the first feedback data at a first quantization, and representing the second feedback data at a second quantization, different from the first quantization.

4. The method according to claim 1, wherein formulating the first and second feedback data comprises calculating the first feedback data at a first spectral resolution, and calculating the second feedback data at a second spectral resolution, different from the first spectral resolution.

5. The method according to claim 1, wherein transmitting the first and second feedback data comprises transmitting the first feedback data at a first update rate, and transmitting the second feedback data at a second update rate, different from the first update rate.

6. The method according to claim 1, wherein formulating the first and second feedback data comprises, upon identifying that first interference caused by the first base station is stronger than second interference caused by the second base station, computing the first feedback data at a first data size and computing the second feedback data at a second data size, smaller than the first data size.

7. The method according to claim 1, wherein formulating the first and second feedback data comprises computing for the first and second communication channels respective first and second channel matrices having respective different first and second ranks.

8. The method according to claim 1, wherein formulating the first and second feedback data comprises defining the first feedback data as the respective channel measure of the first communication channel, and defining the second feedback data as an implicit function of the respective channel measure of the second communication channel.

9. The method according to claim 1, and comprising, in an additional mobile communication terminal, receiving a signal from the first base station over a third communication channel, formulating third feedback data for the third communication channel such that the third feedback data has a third data size that is different from the first data size, and transmitting the third feedback data from the additional mobile communication terminal to at least the one of the base stations.

10. Apparatus, comprising:
a receiver, which is configured to receive from at least first and second base stations, which cooperate in a coordinated transmission scheme such that the first base station is designated as a serving base station via which the mobile communication terminal conducts calls, signals that are transmitted over respective first and second communication channels;
processing circuitry, which is configured to calculate for the communication channels, based on the received signals, respective channel measures that are independent of a transmission or reception scheme used by the base stations and the receiver, and to formulate first and second feedback data, which are indicative of the respective channel measures of the first and second communication channels and have respective first and second data sizes, such that the first data size formulated for the serving base station is larger than the second data size; and a transmitter, which is configured to transmit the first and second feedback data to at least one of the base stations.

11. The apparatus according to claim 10, wherein the processing circuitry is configured to include in the first feedback data at least one feedback parameter that is not included in the second feedback data.

12. The apparatus according to claim 10, wherein the processing circuitry is configured to represent the first feedback data at a first quantization, and to represent the second feedback data at a second quantization, different from the first quantization.

13. The apparatus according to claim 10, wherein the processing circuitry is configured to calculate the first feedback data at a first spectral resolution, and to calculate the second feedback data at a second spectral resolution, different from the first spectral resolution.

14. The apparatus according to claim 10, wherein the processing circuitry is configured to generate the first feedback data at a first update rate, and to generate the second feedback data at a second update rate, different from the first update rate.

15. The apparatus according to claim 10, wherein the processing circuitry is configured to formulate the first and second feedback data by computing for the first and second communication channels respective first and second channel matrices having respective different first and second ranks.

16. The apparatus according to claim 10, wherein the processing circuitry is configured to define the first feedback data as the respective channel measure of the first communication channel, and to define the second feedback data as an implicit function of the respective channel measure of the second communication channel.

17. A mobile communication terminal comprising the apparatus of claim 10.

18. A chipset for processing signals in a mobile communication terminal, comprising the apparatus of claim 10.

19. A system, comprising:

at least first and second base stations, which cooperate in a coordinated transmission scheme and are configured to transmit signals to mobile communication terminals; and a mobile communication terminal, which is configured to receive the signals from the first and second base stations over respective first and second communication channels, wherein the first base station is designated as a serving base station via which the mobile communication terminal conducts calls, to calculate for the communication channels, based on the received signals, respective channel measures that are independent of a transmission or reception scheme used by the base stations and the terminal, to formulate first and second feedback data, which are indicative of the respective channel measures of the first and second communication channels and have respective first and second data sizes, and to transmit the first feedback data at a first data size and the second feedback data at a second data size, smaller than the first data size, to at least one of the base stations.

20. The method according to claim 1, wherein calculating the channel measures comprises calculating respective transfer amplitudes and phases of the communication channels.

21. The method according to claim 1, wherein calculating the channel measures comprises calculating respective covariance matrices for the communication channels.

22. The apparatus according to claim 10, wherein the processing circuitry is configured to calculate the channel measures by calculating respective transfer amplitudes and phases of the communication channels.

23. The apparatus according to claim 10, wherein the processing circuitry is configured to calculate the channel measures by calculating respective covariance matrices for the communication channels.

* * * * *